United States Patent [19]

Ohkura

[11] Patent Number: 4,989,945

[45] Date of Patent: Feb. 5, 1991

[54] BRANCH DEVICE FOR MULTI-CORE OPTICAL FIBER

[75] Inventor: Toshihiko Ohkura, Kanagawa, Japan

[73] Assignee: Sumitomo Electric Industries, Ltd., Osaka, Japan

[21] Appl. No.: 507,995

[22] Filed: Apr. 12, 1990

[30] Foreign Application Priority Data

Apr. 14, 1989 [JP] Japan .................................. 1-95943
Aug. 22, 1989 [JP] Japan .................................. 1-217039

[51] Int. Cl.⁵ ............................ G02B 6/26; G02B 6/44
[52] U.S. Cl. ............................ 350/96.20; 350/96.23; 350/96.33
[58] Field of Search ............... 350/96.20, 96.21, 96.22, 350/96.24, 96.33, 96.23

[56] References Cited

U.S. PATENT DOCUMENTS

| | | | |
|---|---|---|---|
| 4,108,534 | 8/1978 | Le Noane et al. | 350/96.21 |
| 4,172,746 | 10/1979 | Le Noane et al. | 350/96.22 |
| 4,217,028 | 8/1980 | Reh et al. | 350/96.20 |
| 4,339,171 | 7/1982 | Makuch et al. | 350/96.20 |
| 4,589,727 | 5/1986 | Williams | 350/96.20 |
| 4,626,067 | 12/1986 | Watson | 350/96.20 |
| 4,697,873 | 10/1987 | Bouvard et al. | 350/96.23 |
| 4,699,462 | 10/1987 | Jones | 350/96.23 |
| 4,795,230 | 1/1989 | Garcia et al. | 350/96.20 |
| 4,799,760 | 1/1989 | Beatty et al. | 350/96.23 |
| 4,884,862 | 12/1989 | Kofod | 350/96.20 |

Primary Examiner—Brian Healy
Attorney, Agent, or Firm—Cushman, Darby & Cushman

[57] ABSTRACT

In a branch device for multi-core optical fiber according to the present invention, a branch portion protector including a spindle-shaped protector and a perforated member which are integrally formed with each other is provided between the end portion of the multi-core optical fiber and the single-core optical fiber protection tubes so that no excessive force is exerted on the branching-out single-core optical fibers and the optical loss is stable.

8 Claims, 3 Drawing Sheets

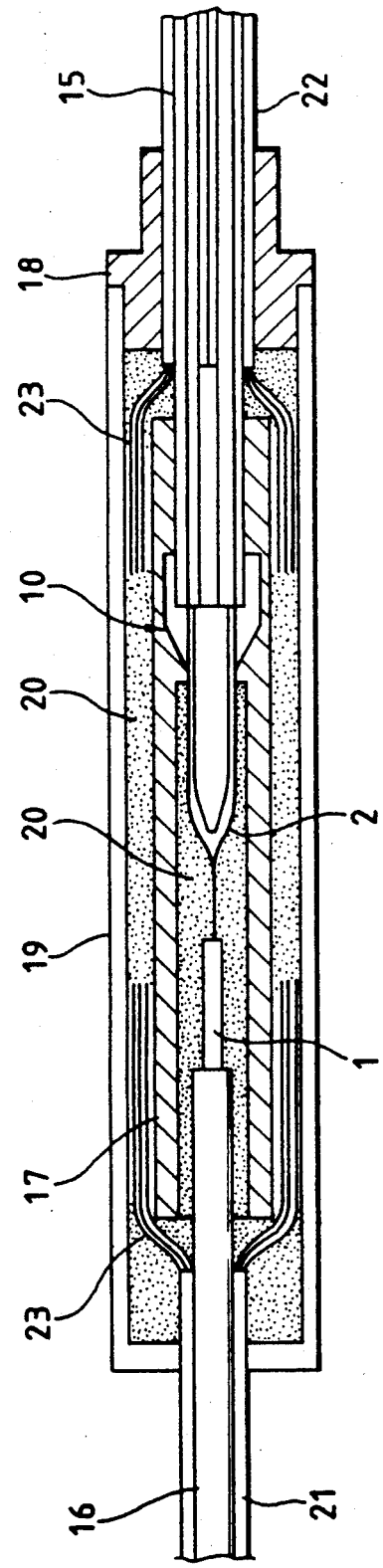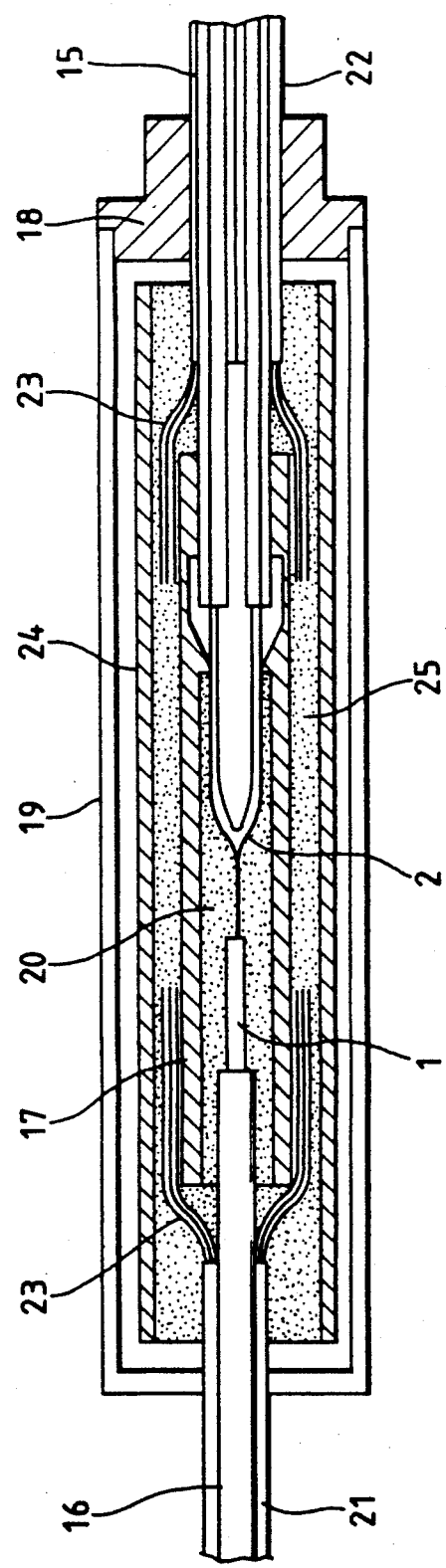

BRANCH DEVICE FOR MULTI-CORE OPTICAL FIBER

FIELD OF THE INVENTION

The present invention relates to a branch device for a multi-core optical fiber tape, a multi-core optical fiber cord or a multi-core optical fiber cable constituted by plurality of single-core optical fibers collected with together, at which the multi-core optical fiber branches into the plurality of single-core optical fibers.

BACKGROUND OF THE INVENTION

FIGS. 1A and 1B show views for explaining an example of the branch portion of a conventional multi-core optical fiber tape. FIG. 1A illustrates the configuration of a multi-branch tube used to form the branch portion and FIG. 1B illustrates the configuration of the branch portion.

A multi-branch tube 31 is constituted by a optical fiber fixing portion 32 which receives and fixes a multi-core optical fiber tape 1, a plurality of single-core optical fiber protection tubes 33 which are disposed on the side opposite to the optical fiber fixing portion 32 so that branched single-core optical fibers 2 are passed therethrough respectively, and a branch portion accommodation space 34 which is formed between the optical fiber fixing portion 32 and the single-core optical fiber protection tubes 33, those portions 32, 33 and 34 being formed integrally with each other.

As shown in FIG. 1B, the multi-core optical fiber tape 1 is fixed at the vicinity of an end portion thereof in the optical fiber fixing portion 32 of the multi-branch tube 31, and the single-core optical fibers 2 branched from the optical fiber tape 1 are inserted through and protected by the single-core optical fiber protection tubes 33 of the multi-branch tube 31. Thus, the branch portion is formed.

FIGS. 2A and 2B show views for explaining another example of the branch portion of a conventional multi-core optical fiber tape. FIG. 2A illustrates the configuration of a multi-branch tube used to form the branch portion and FIG. 2B illustrates the configuration of the branch portion.

This example is different from the example of FIG. 1A in that a multi-branch tube 31 has no portion for fixing a multi-core optical fiber tape 1 and a protection tube 35 for protecting the multi-core optical fiber tape 1 is integrally formed. Accordingly, the optical fiber tape 1 inserted into the protection tube 35 is not fixed thereat.

The foregoing conventional branch portion of the multi-core optical fiber tape 1 is a result of contrivance as to a manner how to make the multi-core optical fiber tape 1 branch into plurality of the single-core optical fibers 2 not to be too extreme, and the branch portion is designed in consideration of the arrangement of the single-core optical fiber protection tubes 33 so that no force is exerted on the single-core optical fibers 2 in the respective single-core optical fiber protection tubes 33. The branch portion is however ineffective in protection of the branching out single-core optical fibers 2 in the branch portion accommodation space 34 between the end portion of the optical fiber tape 1 and the single-core optical fiber protection tubes 33.

There is therefore a problem in that when resin or the like is poured into the branch portion accommodation space 34 so as to fix the single-core optical fibers 2, force is exerted on the single-core optical fibers 2 to thereby cause increase of optical loss. Further, in the case there no resin is poured into the space 34, the increase of optical loss is similarly caused because of lack of stability of the optical fibers 2 in the branch portion accommodation space 34.

SUMMARY OF THE INVENTION

In order to solve the foregoing problem, according to the present invention, provided is a portion of a multi-core optical fiber which is characterized in that a branch portion protector constituted by a perforated member having a plurality of insertion holes formed at the same circumference and a substantially spindle-shaped protector formed integrally with and disposed coaxially with the perforated member is arranged between an end portion of the multi-core optical fiber and the single-core optical fiber protection tubes, and in that the single-core optical fibers branching out from the multi-core optical fiber are passed over the spindle-shaped protector along an outer surface thereof and passed through the insertion holes of the perforated member so as to be inserted through the single-core optical fiber protection tubes respectively.

In the foregoing multi-core optical fiber branch portion according to the present invention a branch portion protector constituted by a perforated member having a plurality of insertion holes formed at the same circumference and a substantially spindle-shaped protector formed integrally with and disposed coaxially with the perforated member is arranged between an end portion of the multi-core optical fiber and the single-core optical fiber protection tubes, and the single-core optical fibers branching out from the multi-core optical fiber are passed over the spindle-shaped protector along an outer surface thereof and passed through the insertion holes of the perforated member so as to be inserted through the single-core optical fiber protection tubes respectively. Accordingly, no excessive bending force or the like is exerted on the branching-out single-core optical fibers.

Further, the branching-out single-core optical fibers and the spindle-shaped protector are fixed to each other with resin or the like, so that it is possible to obtain a branch portion which is more stable with reduced optical loss. In this case, if a plurality of grooves are longitudinally formed in the outer surface of the spindle-shaped protector so as to accommodate the branching-out single-core optical fibers therein, it is possible to obtain a branch portion which is further more stable with reduced optical loss.

BRIEF DESCRIPTION OF THE DRAWINGS

FIGS. 5 and 6 are longitudinal sectional views showing other specific examples of the multi-core optical fiber branch portion according to the present invention.

DESCRIPTION OF PREFERRED EMBODIMENT

Figure 1A:
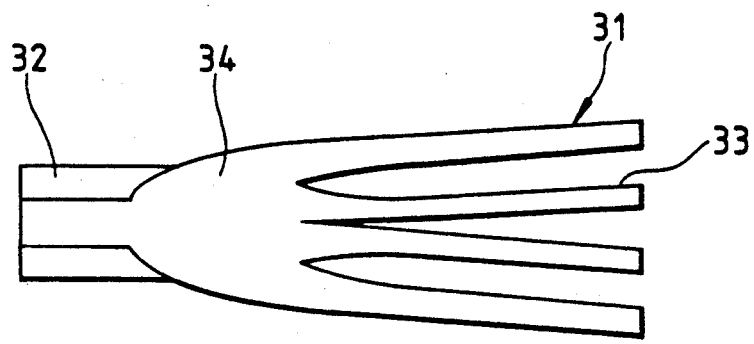
FIGS. 1A, 1B, 2A and 2B are views for explaining the conventional branch portions.
Figure 1B:
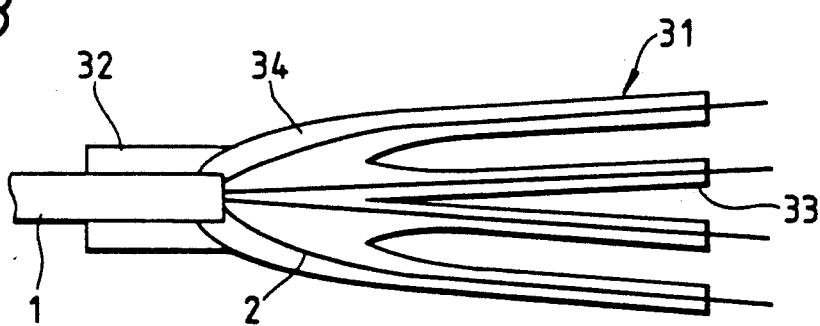
Figure 2A:
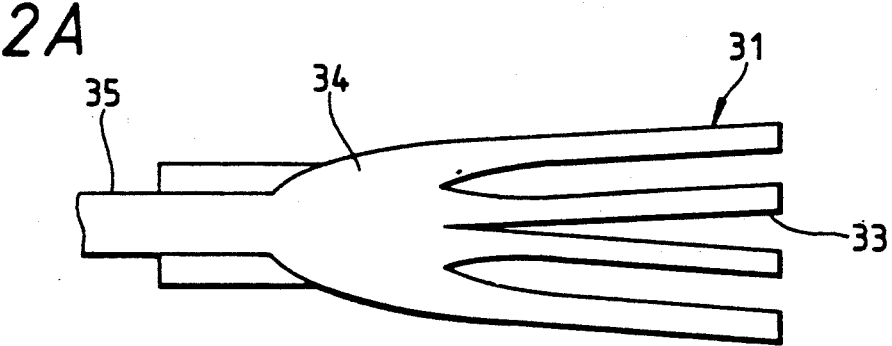
Figure 2B:
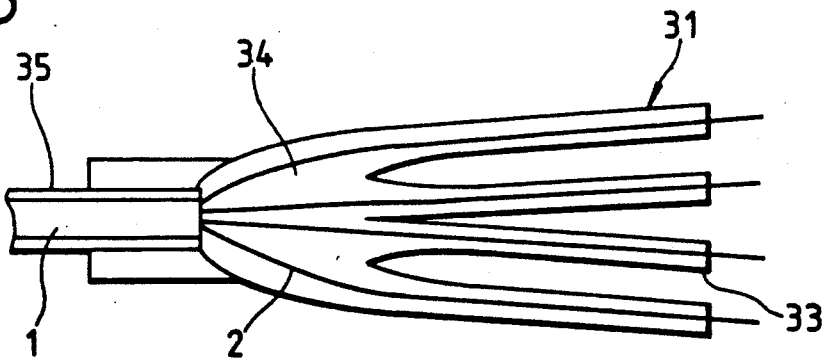
Figure 3:
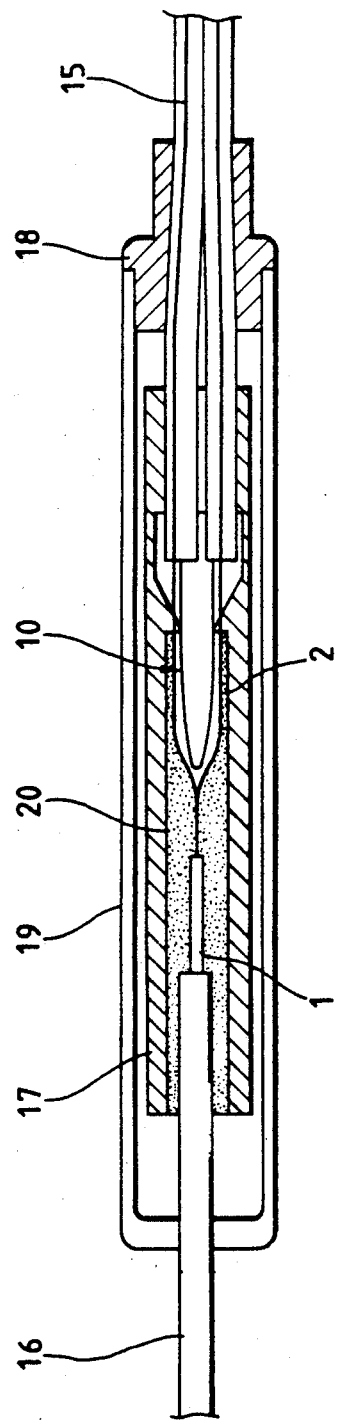
FIG. 3 is a longitudinal sectional view showing a specific example of the multi-core optical fiber branch portion according to the present invention.
Figure 4B:
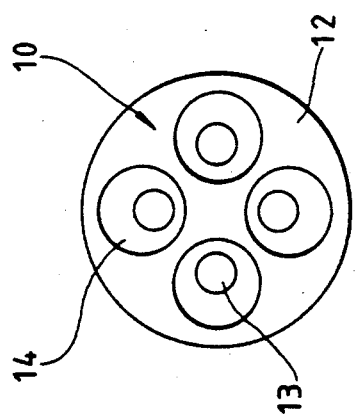
FIGS. 4A and 4B are for explaining the branch portion protector according to the present invention.
Figure 4A:
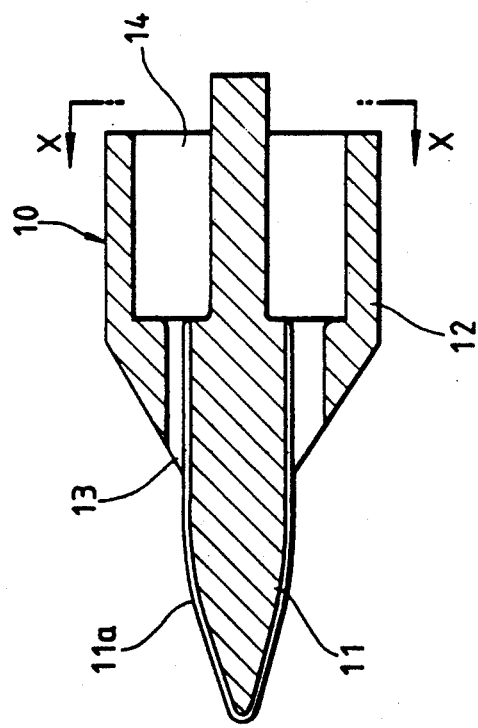

FIG. 3 is a longitudinal sectional view showing an embodiment of the branch portion of the multi-core optical fiber according to the present invention. FIGS. 4A and 4B show the configuration of the branch portion protector constituted by a spindle-shaped protector and a perforated member formed integrally with the spindle-shaped protector according to the present invention. Specifically, FIG. 4A is a longitudinal sectional view and FIG. 4B is a side view in the direction of the arrows X—X of FIG. 4A.

As shown in the drawing, in the branch portion according to the present invention, a branch portion protector 10 is arranged between an end portion of a multi-core optical fiber 1 such as a multi-core optical fiber tape, a multi-core optical fiber cord, or the like, and single-core optical fiber protection tubes 15 for protecting single-core optical fibers 2 which branch out from the optical fiber 1 and are inserted through the protection tubes 15.

The branch portion protector 10 is constituted by a substantially spindle-shaped protector 11 and a perforated member 12 integrally formed with each other, as shown in FIGS. 4A and 4B. The perforated member 12 has pairs of two kinds of large and small insertion holes 13 and 14 formed on the same circumference, each pair having the small insertion hole 13 and the large insertion hole 14 which communicate with each other axially. The substantially spindle-shaped protector 11 is disposed coaxially with the perforated member 12 and has a plurality of grooves 11a formed in the outer surface thereof, if necessary, so as to accommodate therein the branching-out single-core optical fibers 2. In the perforated member 12, the small insertion holes 13 are provided to insert the single-core optical fibers 2 therethrough and the large insertion holes 14 are provided to insert the respective ends of the single-core optical fiber protection tubes 15 therein and to fix them thereat.

The plurality of single-core optical fibers 2 branching out from the multi-core optical fiber 1 are respectively led into the small insertion holes 13 of the perforated member 12 along the outer surface of the spindle-shaped protector 11 of the branch portion protector 10 or along the grooves 11a of the outer surface of the spindle-shaped protector 11, and respectively inserted through the single-core optical fiber protection tubes 15 fixed in the respective large insertion holes 14.

A protection tube 17 is provided so as to envelop the vicinity of the end portion of the multi-core optical fiber 1 and the spindle-shaped protector 11 of the branch portion protector 10. The inside of the protection tube 17 is filled with resin 20 so that the single-core optical fibers 2 and the spindle-shaped protector 11 are fixed. As the resin, formal resin, UV-setting resin, one-component or two-component resin, or the like, may be used. In this case, a heat-shrinkable tube may be used as the protection tube such that the inside thereof is filled with a heat-fusible adhesive. Further, an external protection tube 19 is provided outside the protection tube 17. The multi-core optical fiber 1 is inserted through a protection tube 16 for protection thereof, and one end of the external protection tube 19 is located over a portion of the protection tube 16 and fixed thereat. A rubber boot 18 is attached onto the other end of the external protection tube 19 so as to protect the single-core optical fiber protection tubes 15.

FIG. 5 is a longitudinal sectional view showing another embodiment of the multi-core optical fiber branch portion according to the present invention.

This embodiment shows the case where fibrous anti-tensile bodies 23 and external coatings 21 and 22 are provided over the single-core optical fiber protection tubes 15 and the multi-core optical fiber protection tube 16 so as to reinforce them. In this case, the fibrous anti-tensile bodies 23 are led into between the protection tube 17 and the external protection tube 19, and the inside of the external protection tube 19 is filled with resin so that the fibrous anti-tensile bodies 23 are fixed thereat. As a result, a branch portion durable to tensile force is obtained.

FIG. 6 is a longitudinal sectional view showing a third embodiment of the multi-core optical fiber branch portion according to the present invention.

In this specific example, similarly to the specific example of FIG. 5, the single-core optical fiber protection tubes 15 and the multi-core optical fiber protection tube 16 are reinforced by the fibrous anti-tensile bodies 23 and the external coatings 21 and 22. In this case, the fibrous anti-tensile bodies 23 are led onto the protection tube 17, and then a layer of a heat-shrinkable tube 24 or a heat-shrinkable tube 24 having a heat-fusible adhesive 25 in the inside thereof is provided over the protection tube 17 so as to fix the fibrous anti-tensile bodies 23 on the protection tube 17. As a result, similarly to the embodiment of FIG. 5, a branch portion durable to tensile force is obtained Further, it is not necessary to wait till resin is hardened because no resin is poured into the inside unlike the embodiment of FIG. 5. Accordingly, the working time is shortened.

As described above, in the multi-core optical fiber branch portion according to the present invention, the branch portion protector constituted by the spindle-shaped protector and the perforated member which are integrally formed with each other is provided between the end portion of the multi-core optical fiber and the single-core optical fiber protection tubes so that no excessive force is exerted on the branching-out single-core optical fibers and the optical loss is stable. Therefore, the multi-core optical fiber branch portion according to the present invention is exceedingly effective when it is used as a branch portion of a optical fiber tape or the like which is introduced into an optical fiber cable to reduce the diameter thereof.

What is claimed is:

1. A branch device for a multi-core optical fiber (1), in which single-core optical fibers (2) branching out from said multi-core optical fiber are respectively inserted through single-core optical fiber protection tubes (15), said branch device comprising:
   a branch portion protector (10) being arranged between an end portion of said multi-core optical fiber (1) and said single-core optical fiber protection tubes (15), said branch portion protector including a perforated member (12) having a plurality of insertion holes (13, 14) formed at the same circumference and a substantially spindle-shaped protector (11) formed integrally with said perforated member and disposed coaxially with said perforated member,
   wherein said single-core optical fibers branching out from said multi-core optical fiber are passed over said spindle-shaped protector along an outer surface thereof and passed through said insertion holes of said perforated member so as to be inserted through said single-core optical fiber protection tubes respectively.

2. A branch device as claimed in claim 1, wherein plurality of grooves (11a) are longitudinally formed on the outer surface of said spindle-shaped protector (11)

to accommodated said single-core optical fibers (2) respectively.

3. A branch device claimed in claim 1 further comprising:
    a branch portion protection tube (17) for protecting said branch portion in the manner that the inside of said branch portion protection tube is filled with resin (20) to fix said branch portion.

4. A branch device as claimed in claim 3, wherein said resin (20) filled in said branch portion protection tube is selected from a group comprising formal resin, UV-setting resin, one-component resin and two-component resin.

5. A branch device as claimed in claim 3, wherein said branch portion protection tube (17) is a heat-shrinkable tube having heat-fusible resin (20) provided in the inside thereof.

6. A branch device as claimed in claim 1, wherein said single-core optical fiber protection tubes (15) and a multi-core optical fiber protection tube (16) are reinforced with fibrous anti-tensile bodies (23) and external coatings (21, 22), said fibrous anti-tensile bodies are led into a portion between a branch portion protection tube (17) and an external protection tube (19) and said portion is filled with resin (20) so that said fibrous anti-tensile bodies are fixed thereat.

7. A branch device as claimed in any one of claims 1 through 3 further comprising a heat-shrinkable tube (24) provided outside of fibrous anti-tensile bodies (23) and external coatings tubes (21, 22), and said fibrous anti-tensile bodies are led into between said heat-shrinkable tube and said branch portion protection tube (17) so as to be fixed on said branch portion protection tubes.

8. A branch device as claimed in claim 7, wherein said heat-shrinkable tube (24) has a heat-fusible adhesive (25) provided in the inside thereof.

* * * * *